(12) United States Patent
Chen

(10) Patent No.: US 10,540,600 B2
(45) Date of Patent: Jan. 21, 2020

(54) METHOD AND APPARATUS FOR DETECTING CHANGED DATA

(71) Applicant: TENCENT TECHNOLOGY (SHENZHEN) COMPANY LIMITED, Shenzhen (CN)

(72) Inventor: Tangxi Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 477 days.

(21) Appl. No.: 15/321,178

(22) PCT Filed: Jun. 23, 2015

(86) PCT No.: PCT/CN2015/082068
§ 371 (c)(1),
(2) Date: Dec. 21, 2016

(87) PCT Pub. No.: WO2015/196962
PCT Pub. Date: Dec. 30, 2015

(65) Prior Publication Data
US 2017/0154277 A1 Jun. 1, 2017

(30) Foreign Application Priority Data
Jun. 24, 2014 (CN) .......................... 2014 1 0288761

(51) Int. Cl.
*G06N 7/00* (2006.01)
*G06F 16/21* (2019.01)
(Continued)

(52) U.S. Cl.
CPC ........... *G06N 7/005* (2013.01); *G06F 16/219* (2019.01); *G06F 16/2237* (2019.01); *G06F 16/2358* (2019.01)

(58) Field of Classification Search
CPC ... G06N 7/005; G06F 16/2237; G06F 16/219; G06F 16/2358
See application file for complete search history.

(56) References Cited

U.S. PATENT DOCUMENTS

| | | | |
|---|---|---|---|
| 2012/0137112 A1 | 5/2012 | Bolen et al. | |
| 2015/0046385 A1* | 2/2015 | Shimizu | G06F 3/0653 706/52 |

(Continued)

FOREIGN PATENT DOCUMENTS

| | | |
|---|---|---|
| CN | 1938702 A | 3/2007 |
| CN | 101499069 A | 8/2009 |

(Continued)

OTHER PUBLICATIONS

The State Intellectual Property Office of the People's Republic of China (SIPO) Office Action 1 for 201410288761.1 Feb. 27, 2015 pp. 1-7.

(Continued)

*Primary Examiner* — Austin Hicks
(74) *Attorney, Agent, or Firm* — Anova Law Group, PLLC

(57) ABSTRACT

A method and an apparatus for detecting changed data are provided. The method includes: recording change status information of each data field in a data table during a version change; obtaining a probability of a second data field being changed simultaneously when a first data field is changed, the probability being a confidence probability of the second data field being changed in the first data field being changed; determining, when confidence probabilities of at least two second data fields being changed in the same first data field being changed are greater than a confidence probability threshold of the data table, that the second data fields corresponding to the confidence probabilities greater than the confidence probability threshold are a combined field;

(Continued)

determining whether a combination of the changed data fields matches a combined field template during the current version change, and prompting a location of the unmatched changed data field.

16 Claims, 3 Drawing Sheets

(51) Int. Cl.
*G06F 16/22* (2019.01)
*G06F 16/23* (2019.01)

(56) References Cited

U.S. PATENT DOCUMENTS

2015/0355633 A1* 12/2015 Nagatani ............ G05B 19/4155
  700/275
2018/0220446 A1* 8/2018 Sesia ..................... H04L 1/0045

FOREIGN PATENT DOCUMENTS

| CN | 102063494 A | 5/2011 |
| CN | 102323858 A | 1/2012 |
| CN | 103473339 A | 12/2013 |
| CN | 103548019 A | 1/2014 |
| CN | 104133836 A | 11/2014 |

OTHER PUBLICATIONS

The World Intellectual Property Organization (WIPO) International Search Report for PCT/CN2015/082068 Sep. 2, 2015 pp. 1-3.

* cited by examiner

METHOD AND APPARATUS FOR DETECTING CHANGED DATA

CROSS-REFERENCE TO RELATED APPLICATION

This application claims priority to PCT Application No. PCT/CN2015/082068, filed on Jun. 23, 2015, which claims priority to Chinese Patent Application No. 2014102887611, filed on Jun. 24, 2014, all of which is hereby incorporated by reference in their entirety.

FIELD OF THE TECHNOLOGY

The present disclosure generally relates to the field of data processing technologies, and in particular, relates to a method and an apparatus for detecting changed data.

BACKGROUND OF THE DISCLOSURE

A process for changing a version of an application program usually involves changes of a large amount of data. In a certain technology, a precise test may be used to compare programs, code, resources, and data of two versions to detect differences between the two versions, so that a tester may understand how data are adjusted between the two versions, and may further determine whether these adjustments meet expected changes.

However, in some data tables, changing of data involves many fields, and the specific meaning of the data is not very clear, so that the data change cannot be understood by others except the owner; or associations between some data tables are too strong, and even one change needs to be associated with multiple pieces of data or even multiple tables. In these cases, a tester needs to spend a large amount of time to verify whether the changed data is normal, which cannot be implemented in a time limited version test. That is, there exists a problem of slow speed and low efficiency when a large amount of changed data is detected manually.

SUMMARY

The present disclosure provides a method and an apparatus for detecting changed data, so as to solve a problem of slow speed and low efficiency for detecting a large amount of changed data manually in the existing technology.

A method for detecting changed data includes: recording change status information of each data field in a data table during a version change; obtaining, according to the change status information, a probability of a second data field being changed at the same time when a first data field is changed, the probability being a confidence probability of the second data field being changed in the first data field being changed; determining, when confidence probabilities of at least two second data fields being changed in the same first data field being changed are greater than a confidence probability threshold of the data table, that the second data fields corresponding to the confidence probabilities greater than the confidence probability threshold are a combined field; determining whether a combination of the changed data fields matches a combined field template during the current version change, and prompting a location of the unmatched changed data field if the combination of the changed data fields does not match the combined field template during the current version change, the combined field template being any combined field or a combination of at least two of the combined fields excluding same data fields.

An apparatus for detecting changed data includes: a recording unit, configured to record change status information of each data field in a data table during a version change; an obtaining unit, configured to obtain, according to all the change status information, a probability of a second data field being changed at the same time when a first data field is changed, the probability being a confidence probability of the second data field being changed in the first data field being changed; a determining unit, configured to determine, when confidence probabilities of at least two second data fields being changed in the same first data field being changed are greater than a confidence probability threshold of the data table, that the second data fields corresponding to the confidence probabilities greater than the confidence probability threshold are a combined field; a judging unit, configured to determine whether a combination of the changed data fields matches a combined field template during the current version change, the combined field template being any combined field or a combination of at least two of the combined fields excluding same data fields; and a prompting unit, configured to prompt a location of the unmatched changed data field if the judging unit determines that the combination of the changed data fields does not match the combined field template during the current version change.

In embodiments of the present invention, a large quantity of changes of each data field in a data table during a version change is recorded and analyzed to obtain an association between some data fields in any data table, and according to the association between the data fields, whether some data fields are changed unnecessarily or changes of some data fields are missing during a data change may be determined, thereby reducing the manual determination processes when changing a large amount of data, and improving speed and efficiency for detecting the large amount of changed data.

DESCRIPTION OF EMBODIMENTS

To make the objectives, technical solutions, and advantages of the present disclosure clearer, the following further describes embodiments of the present invention in detail with reference to the accompanying drawings and specific embodiments.

In the existing technology, in a precise test, by comparing programs, code, resources, and data between two versions, differences between the two versions are detected, and test content with guiding significance is output according to a pre-made mapping rule. Although information, such as data values before and after the change, has been listed in the precise test, a tester needs to spend a large amount of time and energy to verify whether the changed data has been normally changed, which is hard to be implemented especially when the version change time is limited. If the tester takes chances to merely have a rough look at the changed data, the changed data information provided by the precise test is often meaningless, and whether the changed data has been normally changed cannot be detected.

A method and an apparatus for detecting changed data provided in the embodiments of the present invention provide a high speed and efficiency when a large amount of changed data is detected. Massive data accumulated in precise tests in continual version changes are analysed whether some data fields in any data table are associated with each other, and according to the association, a detection result about whether some data fields are changed unnecessarily or changes of some data fields are missed is directly obtained, thereby reducing manual determining processes when a large amount of data is changed, and improving speed and efficiency for detecting the large amount of the changed data.

The embodiments of the present invention also provide an apparatus for detecting changed data. The apparatus for detecting changed data may specifically be integrated into a client, and the client may be installed in a computing device, where the computing device may be a laptop computer, a desktop computer, a server, or the like.

Figure 1:
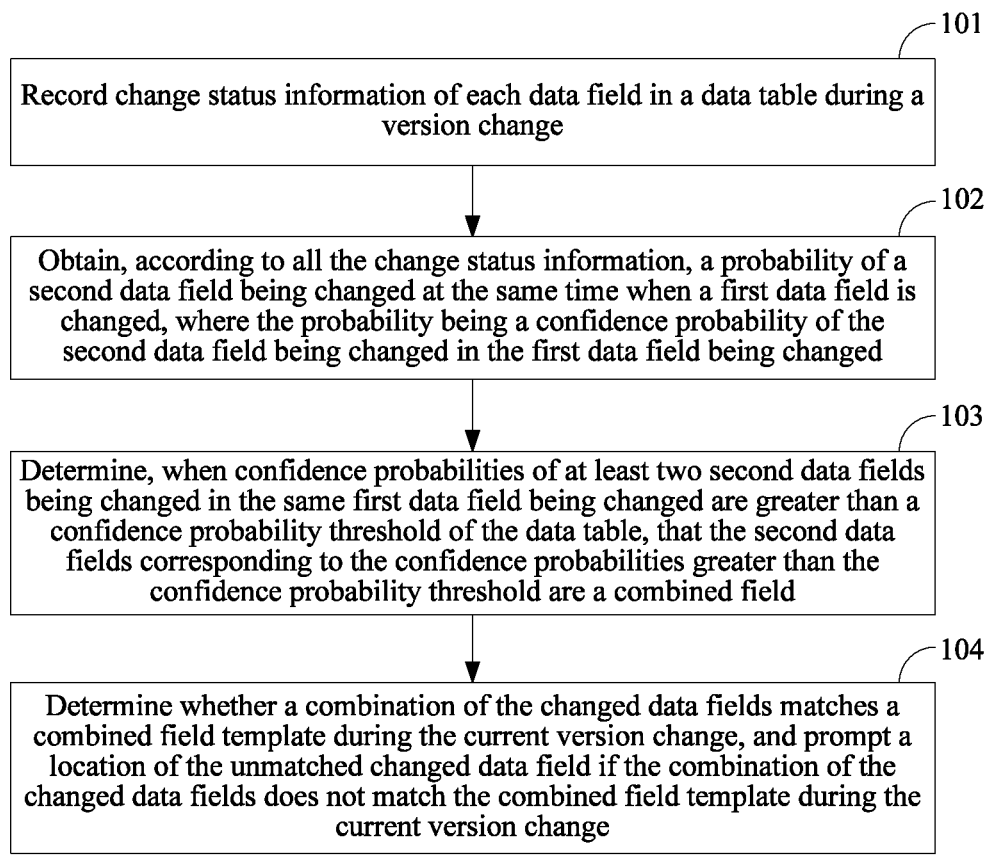
FIG. 1 illustrates a flowchart of an exemplary method for detecting changed data according to an embodiment of the present invention.

As shown in FIG. 1, an exemplary method for detecting changed data according to an embodiment of the present invention may include the following steps.

Step 101: Record change status information of each data field in a data table during a version change.

During each version change, whether each data field in the data table is changed is recorded, item by item in sequence. The change status information may indicate whether a certain data field is changed, for example, in a certain version change, if a data field A is changed, change status information of the data field A may be 1, indicating that the data field A is changed, and if the data field A is not changed, the change status information is 0.

In specific implementation, the change status information of each data field in the data table during the version change may be recorded according to a sequence of original data fields in the data table, so as to form a change status information table. For example, as shown in Table 1, which is an example of a change status information table, data fields in Table 1 are the same as those in an original data table except that, in Table 1, an identification field of a version number is added to the first column to differentiate the version changes. A simple model design may be used, where 1 indicates that a data field is changed, and 0 indicates that a data field is not changed, so that the change status information of each data field in the data table during each version change may be recorded.

TABLE 1

| Version number | id | buff_remark | name | MaxLayer |
| --- | --- | --- | --- | --- |
| 20140601001 | 0 | 0 | 1 | 0 |
| 20140601002 | 0 | 0 | 0 | 0 |
| 20140602001 | 1 | 0 | 1 | 0 |
| 20140602002 | 1 | 0 | 0 | 0 |
| 20140602003 | 1 | 1 | 0 | 0 |

In addition, the change status information table is based on the structure of the current data table, that is, expect the version number field in the change status information table, other data fields in the change status information table are the same as those in the current data table. However, to record changes of the data table structure, a line of data may be added to the first row as an addition identifier or a deletion identifier of a data field. For example, if a version number is named 0, in other data fields, 1 or 0 is used to indicate whether the data field corresponding to the current version is in use, and when a data field is marked as a data field not used by the current version, data of the data field may be ignored in subsequent calculations, thereby improving the calculation speed.

Step 102: Obtain, according to all the change status information, a probability of a second data field being changed at the same time when a first data field is changed, the probability being a confidence probability of the second data field being changed in the first data field being changed.

A probability of event B occurring at the same time when event A occurs refers to a confidence probability of event B in event A. In this embodiment of the present invention, event A indicates a first data field being changed, and event B indicates a second data field being changed, so that a probability of the second data field being changed at the same time when the first data field is changed is a confidence probability of the second data field being changed in the first data field being changed.

The first data field and the second data field both are all fields in sequence in the data table. Data in the foregoing table is used as an example. Because the data table has four data fields: a field id, a field buff_remark, a field name, and a field MaxLayer, the first data field is the field id, the field buff_remark, the field name, and the field MaxLayer; and the second data field is also the field id, the field buff_remark, the field name, and the field MaxLayer. Distinguishing the first data field from the second data field is because event A needs to be distinguished from event B. For example, a probability of the field buff_remark being changed at the same time when the field id is changed (in this case, the field id is the first data field and the field buff_remark is the second data field) is different from a probability of the field id being changed at the same time when the field buff_remark is changed (in this case, the field buff_remark is the first data field and the field id is the second data field).

In some embodiments of the present invention, specific implementations of obtaining, according to all the change status information, a probability of a second data field being changed at the same time when a first data field is changed may include:

recording, according to all the change status information, the number of times that the second data field being changed at the same time when the first data field is changed; and dividing the number of times that the second data field being changed at the same time when the first data field is changed by the number of times that the first data field is changed, to obtain the probability of the second data field being changed at the same time when the first data field is changed.

When the first data field is the same as the second data field, the number of times that the second data field being changed at the same time when the first data field is changed is the number of times that the first data field is changed. For example, the number of times that the second data field (the field id) being changed at the same time when the first data field (the field id) is changed is the number of times that the first data field (the field id) is changed.

Therefore, when the first data field is the same as the second data field, the probability of the second data field being changed at the same time when the first data field is changed is 1. For example, the probability of the second data field (the field id) being changed at the same time when the first data field (the field id) is changed is absolutely 1.

For another example, the probability of the field buff_remark being changed at the same time when the field id is changed equals to the number of times 30 that the field buff_remark being changed at the same time when the field id is changed divided by the number of times 100 that the field id being changed at the same time when the field id is changed (that is, the number of times that the field id is changed), so that the probability of the second data field (the field buff_remark) being changed at the same time when the first data field (the field id) is changed is 0.3.

Step 103: Determine, when confidence probabilities of at least two second data fields being changed in the same first data field being changed are greater than a confidence probability threshold of the data table, that the second data fields corresponding to the confidence probabilities greater than the confidence probability threshold are a combined field.

When multiple events exist, a confidence probability among multiple events exists. On the premise of setting a confidence probability a, if the confidence probabilities of some events in event A are greater than α, these events are all confidence templates of event A in α; and if the confidence probabilities of some events in event A are less than α, these events are independent templates of event A in α. This step is performed to obtain a confidence template of a first data field being changed in the confidence probability threshold.

The foregoing data fields are still used as an example. For example, if the first data field is the field id, and the confidence probability threshold is 0.3, the probability of the second data field (the field id) being changed at the same time when the first data field (the field id) is changed is 1, and the probability of the second data field (the field buff_remark) being changed at the same time when the first data field (the field id) is changed is 0.3. The two confidence probabilities are greater than the confidence probability threshold, so that it may be determined that the corresponding second data fields: the field id and the field buff_remark are a combined field. In a combined field, data fields are associated with each other, and there is a high probability to change these data fields together.

Step 104: Determine whether a combination of the changed data fields matches a combined field template during the current version change, and prompt a location of the unmatched changed data field if the combination of the changed data fields does not match the combined field template during the current version change, the combined field template being any combined field or a combination of at least two of the combined fields excluding same data fields.

For example, in Step 103, three combined fields: [the field id and the field buff_remark], [the field id, the field buff_remark, and the field name], [the field name and the field MaxLayer], are determined. These three combined fields themselves may be combined field templates. The combined fields [the field id and the field buff_remark] and [the field name and the field MaxLayer] excluding same data fields may be combined to a combined field template. During the current version change, whether a combination of the changed data fields matches the obtained combined field template is determined. For example, if the current changed data fields are [the field id, the field buff_remark, and the field MaxLayer], which do not match any combined field template, it may be that the field MaxLayer is changed unnecessarily or the change of the field name is missed; therefore, a corresponding prompt is needed. Therefore, the changes of the data fields are recorded to quickly obtain a detection result about whether the changed data fields are changed unnecessarily or changes of some data fields are missed, thereby significantly reducing manual determining behaviors, and improving speed and efficiency for detecting changed data.

Figure 2:
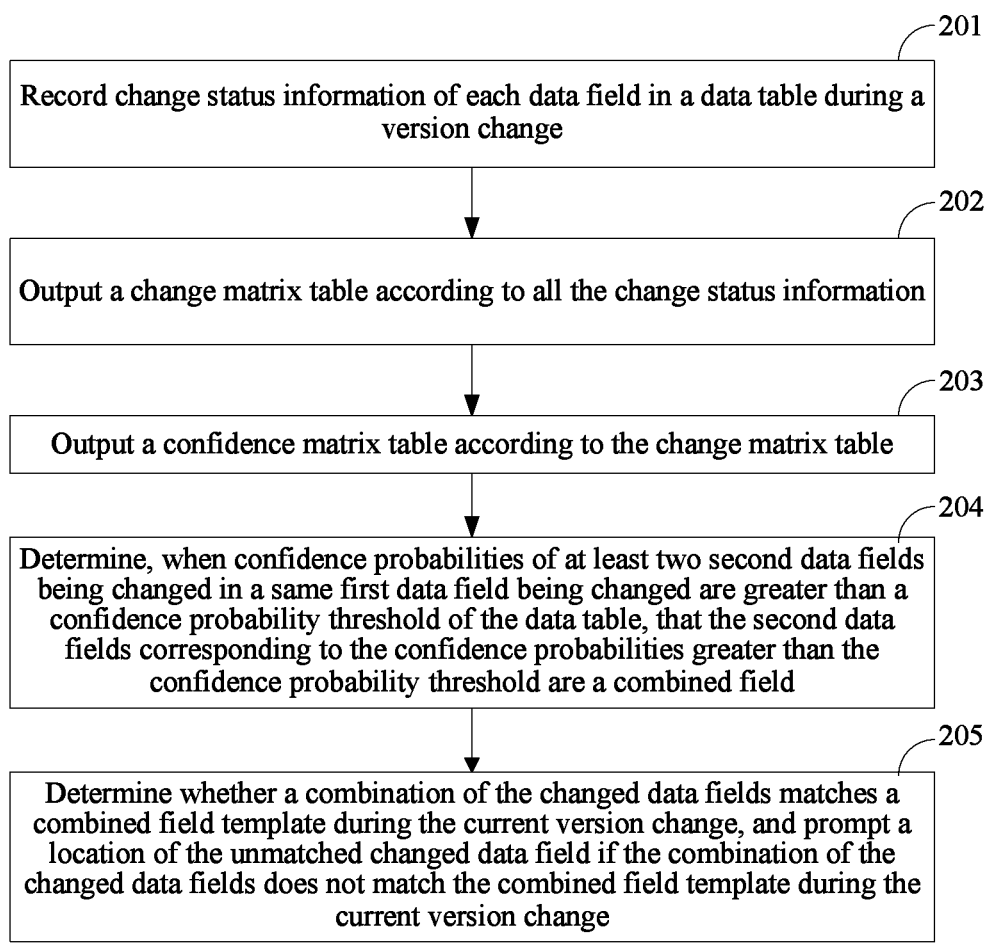
FIG. 2 illustrates a flowchart of another exemplary method for detecting changed data according to an embodiment of the present invention.

As shown in FIG. 2, an exemplary method for detecting changed data according to an embodiment of the present invention may include the following steps.

Step 201: Record change status information of each data field in a data table during a version change.

In this embodiment, Step 201 is the same as or similar with Step 101, and for corresponding description, reference may be made to the foregoing embodiment, which is not repeatedly described herein.

Step 202: Output a change matrix table according to all the change status information.

In some embodiments of the present invention, specific implementation of recording, according to all the change status information, the number of times that a second data field being changed at the same time when a first data field is changed may include: outputting a change matrix table according to all the change status information.

In some embodiments of the present invention, specific implementations of the change matrix table may include at least two of the following:

first, an element of the $i^{th}$ column of the $j^{th}$ row of the change matrix table indicates the number of times that the $j^{th}$ second data field being changed at the same time when the $i^{th}$ first data field is changed, where i and j are integers not less than 1; and second, an element of the $j^{th}$ column of the $i^{th}$ row of the change matrix table indicates the number of times that the $j^{th}$ second data field being changed at the same time when the $i^{th}$ first data field is changed, where i and j are integers not less than 1.

Step 203: Output a confidence matrix table according to the change matrix table.

In some embodiments of the present invention, specific implementation of obtaining a probability of the second data field being changed at the same time when the first data field is changed by dividing the number of times that the second data field being changed at the same time when the first data field is changed by the number of times that the first data field is changed may include: outputting a confidence matrix table according to the change matrix table.

In some embodiments of the present invention, corresponding to the two specific implementations of the foregoing change matrix table, specific implementations of the confidence matrix table may include at least two of the following:

first, an element of the $i^{th}$ column of the $j^{th}$ row of the confidence matrix table is a result of dividing the element of the $i^{th}$ column of the $j^{th}$ row of the change matrix table by an element of the $i^{th}$ column of the $i^{th}$ row of the change matrix table, indicating a probability of the $j^{th}$ second data field being changed at the same time when the $i^{th}$ first data field is changed; and second, an element of the $j^{th}$ column of the $i^{th}$ row of the confidence matrix table is a result of dividing the element of the $j^{th}$ column of the $i^{th}$ row of the change matrix table by the element of the $i^{th}$ column of the $i^{th}$ row of the change matrix table, indicating a probability of the $j^{th}$ second data field being changed at the same time when the $i^{th}$ first data field is changed.

Step 204: Determine, when confidence probabilities of at least two second data fields being changed in the same first data field being changed are greater than a confidence probability threshold of the data table, that the second data fields corresponding to the confidence probabilities greater than the confidence probability threshold are a combined field.

In some embodiments of the present invention, corresponding to the two specific implementations of the foregoing confidence matrix table, specific implementations of the determining, when confidence probabilities of at least two second data fields being changed in the same first data field being changed are greater than the confidence probability threshold of the data table, that the second data fields corresponding to the confidence probabilities greater than the confidence probability threshold are a combined field may include at least two of the following:

first, determining, when at least two elements of the $i^{th}$ column of the confidence matrix table are greater than the confidence probability threshold, that the $j^{th}$ second data fields corresponding to the elements greater than the confidence probability threshold are a combined field; and second, determining when at least two elements of the $i^{th}$ row of the confidence matrix table are greater than the confidence probability threshold, that the $j^{th}$ second data fields corresponding to the elements greater than the confidence probability threshold are a combined field.

Step 205: Determine whether a combination of the changed data fields matches a combined field template during the current version change, and prompt a location of the unmatched changed data field if the combination of the changed data fields does not match the combined field template during the current version change, the combined field template being any combined field or a combination of at least two of the combined fields excluding same data fields.

In this embodiment, Step 205 is the same as Step 105, and for corresponding description, reference may be made to the foregoing embodiment, which is not repeatedly described herein.

The following describes two different specific implementation forms of outputting a change matrix table according to all the change status information, outputting a confidence matrix table according to the change matrix table, and determining a combined field according to the confidence matrix table that are involved in this embodiment by using specific examples.

A first specific implementation form of outputting a change matrix table according to all the change status information, outputting a confidence matrix table according to the change matrix table, and determining a combined field according to the confidence matrix table is:

outputting a change matrix table according to all the change status information, where an element of the $i^{th}$ column of the $j^{th}$ row of the change matrix table indicates the number of times that the $j^{th}$ second data field being changed at the same time when the $i^{th}$ first data field is changed, where i and j are integers not less than 1.

As shown in Table 2, which is example 1 of the change matrix table, in the change matrix table, a column header represents the first data field, and a row header represents the second data field. For example, an element of the $1^{st}$ column of the $2^{nd}$ row indicates that the number of times that the $2^{nd}$ second data field (the field buff_remark) being changed at the same time when the $1^{st}$ first data field (the field id) is changed is 30, and an element of the $1^{st}$ column of the $1^{st}$ row indicates that the number of times that the $1^{st}$ second data field (the field id) being changed at the same time when the $1^{st}$ first data field (the field id) is changed is 100, that is, the number of times that the $1^{st}$ first data field is changed is 100.

It should be noted that, the change matrix table is a symmetrical matrix, where the number of times that the $j^{th}$ second data field being changed at the same time when the $i^{th}$ first data field is changed is the same as the number of times that the $i^{th}$ second data field being changed at the same time when the $j^{th}$ first data field is changed.

TABLE 2

|  | id | buff_remark | name | MaxLayer |
| --- | --- | --- | --- | --- |
| id | 100 | 30 | 21 | 5 |
| buff_remark | 30 | 46 | 23 | 3 |
| name | 21 | 23 | 50 | 12 |
| MaxLayer | 5 | 3 | 12 | 40 |

A confidence matrix table may be output according to the change matrix table. In the confidence matrix table, an element of the $i^{th}$ column of the $j^{th}$ row is a result of dividing the element of the $i^{th}$ column of the $j^{th}$ row of the change matrix table by an element of the $i^{th}$ column of the $i^{th}$ row of the change matrix table, indicating a probability of the $j^{th}$ second data field being changed at the same time when the $i^{th}$ first data field is changed.

As shown in Table 2, which is example 1 of the confidence matrix table, in the confidence matrix table, a column header represents the first data field, and a row header represents the second data field. For example, an element of the $1^{st}$ column of the $2^{nd}$ row indicates that the probability of the $2^{nd}$ second data field (the field buff_remark) being changed at the same time when the $1^{st}$ first data field (the field id) is changed is 0.3, which is obtained by dividing the element 30 of the $1^{st}$ column of the $2^{nd}$ row of the change matrix table by the element 100 of the $1^{st}$ column of the $1^{st}$ row of the change matrix table, that is, dividing the number of times that the $2^{nd}$ second data field (the field buff_remark) being changed at the same time when the $1^{st}$ first data field (the field id) is changed by the number of times that the $1^{st}$ first data field (the field id) is changed.

It should be noted that, the confidence matrix table is not a symmetrical matrix, where the probability of the field buff_remark being changed at the same time when the field id is changed is 0.3, and the probability of the field id being changed at the same time when the field buff_remark is changed is 0.6521.

TABLE 3

|  | id | buff_remark | name | MaxLayer |
| --- | --- | --- | --- | --- |
| id | 1 | 0.6521 | 0.42 | 0.125 |
| buff_remark | 0.3 | 1 | 0.46 | 0.075 |
| name | 0.21 | 0.5 | 1 | 0.3 |
| MaxLayer | 0.05 | 0.0652 | 0.24 | 1 |

Although the confidence probability is obtained, generally multiple data fields are changed during each change, so that it is necessary to determine which data fields are combined fields.

When at least two elements of the $i^{th}$ column of the confidence matrix table are greater than the confidence probability threshold, it may be determined that the $j^{th}$ second data fields corresponding to the elements greater than the confidence probability threshold are a combined field.

As shown in Table 4, which is example 1 of the combined field, in the confidence matrix table, the column header represents the first data field, and the row header represents the second data field, so that elements of each column correspond to the same first data field, and when two or more elements of a column are greater than or equal to the confidence probability threshold, it may be determined that the row header fields corresponding to these elements may be combined to a combined field. For example, if the confidence probability threshold is 0.3, and two elements of the $1^{st}$ column in the confidence matrix table are greater than or equal to 0.3, which are the $1^{st}$ and $2^{nd}$ second data fields (the field id and the field buff_remark) respectively, the two fields are a combined field. Likewise, in the $2^{nd}$ column, elements in the $1^{st}$, $2^{nd}$, and $3^{rd}$ rows are greater than the confidence probability threshold, and the corresponding field id, field buff_remark, and field name may be combined to a combined field; in the $3^{rd}$ column, elements in the $1^{st}$, $2^{nd}$, and $3^{rd}$ rows are greater than the confidence probability threshold, and the corresponding field id, field buff_remark, and field name may be combined to a combined field; and in the $4^{th}$ column, elements in the $3^{rd}$ and $4^{th}$ rows are greater than the confidence probability threshold, and the corresponding field name and field MaxLayer may be combined to a combined field. In Table 4, row header fields corresponding to cells showing numbers 1, 0.3, 0.6521, 0.5, 0.42, and 0.46 in units of columns are combined fields.

TABLE 4

Example 1 of the combined field

|  | id | buff_remark | name | MaxLayer |
|---|---|---|---|---|
| id | 1 | 0.6521 | 0.42 | 0.125 |
| buff_remark | 0.3 | 1 | 0.46 | 0.075 |
| name | 0.21 | 0.5 | 1 | 0.3 |
| MaxLayer | 0.05 | 0.0652 | 0.24 | 1 |

Therefore, three combined fields [the field id and the field buff_remark], [the field id, the field buff_remark, and the field name], and [the field name and the field MaxLayer] are obtained, and the field id, the field buff_remark, the field name, and the field MaxLayer independent from each other are four independent fields.

In this case, if a change record is [the field id, the field buff_remark, and the field MaxLayer], it can be seen by using a combined field template that there are two possibilities:

(1) [the field id and the field buff_remark] and an independent field MaxLayer: if the probability of the field MaxLayer being changed at the same time when the field id is changed is 5%, there is a probability of 95% that the field MaxLayer is changed unnecessarily; and (2) [the field id and the field buff_remark] and [the field name and the field MaxLayer]: there is a highest probability of 30% that the change of the field name is missed.

The following describes a second specific implementation form of outputting a change matrix table according to all the change status information, outputting a confidence matrix table according to the change matrix table, and determining a combined field according to the confidence matrix table:

outputting a change matrix table according to all the change status information, where an element of the $j^{th}$ column of the $i^{th}$ row of the change matrix table indicates the number of times that the $j^{th}$ second data field being changed at the same time when the $i^{th}$ first data field is changed, where i and j are integers not less than 1.

As shown in Table 5, which is example 2 of the change matrix table, in the change matrix table, a row header represents the first data field, and a column header represents the second data field. For example, an element of the $2^{nd}$ column of the $1^{st}$ row indicates that the number of times that the $2^{nd}$ second data field (the field buff_remark) being changed at the same time when the $1^{st}$ first data field (the field id) is changed is 30, and an element of the $1^{st}$ column of the $1^{st}$ row indicates that the number of times that the $1^{st}$ second data field (the field id) being changed at the same time when the $1^{st}$ first data field (the field id) is changed is 100, that is, the number of times that the $1^{st}$ first data field is changed is 100.

It should be noted that, because the change matrix table is a symmetrical matrix, example 1 and example 2 of the change matrix table are the same.

TABLE 5

|  | id | buff_remark | name | MaxLayer |
|---|---|---|---|---|
| id | 100 | 30 | 21 | 5 |
| buff_remark | 30 | 46 | 23 | 3 |
| name | 21 | 23 | 50 | 12 |
| MaxLayer | 5 | 3 | 12 | 40 |

A confidence matrix table may be output according to the change matrix table. In the confidence matrix table, an element of the $j^{th}$ column of the $i^{th}$ row is a result of dividing the element of the $j^{th}$ column of the $i^{th}$ row of the change matrix table by an element of the $i^{th}$ column of the $i^{th}$ row of the change matrix table, indicating a probability of the $j^{th}$ second data field being changed at the same time when the $i^{th}$ first data field is changed.

As shown in Table 6, which is example 2 of the confidence matrix table, in the confidence matrix table, a row header represents the first data field, and a column header represents the second data field, for example, an element of the $2^{nd}$ column of the $1^{st}$ row indicates that the probability of the $2^{nd}$ second data field (the field buff_remark) being changed at the same time when the $1^{st}$ first data field (the field id) is changed is 0.3, which is obtained by dividing the element 30 of the $2^{nd}$ column of the $1^{st}$ row of the change matrix table by the element 100 of the $1^{st}$ column of the $1^{st}$ row of the change matrix table, that is, dividing the number of times that the $2^{nd}$ second data field (the field buff_remark) being changed at the same time when the $1^{st}$ first data field (the field id) is changed by the number of times that the $1^{st}$ first data field (the field id) is changed.

TABLE 6

|  | id | buff_remark | name | MaxLayer |
|---|---|---|---|---|
| id | 1 | 0.3 | 0.21 | 0.05 |
| buff_remark | 0.6521 | 1 | 0.5 | 0.0652 |
| name | 0.42 | 0.46 | 1 | 0.24 |
| MaxLayer | 0.125 | 0.075 | 0.3 | 1 |

When at least two elements of the $i^{th}$ row of the confidence matrix table are greater than the confidence probability threshold, it may be determined that the $j^{th}$ second data fields corresponding to the elements greater than the confidence probability threshold are a combined field.

As shown in Table 7, which is example 2 of the combined field, in the confidence matrix table, the row header represents the first data field, and the column header represents the second data field, so that elements of each row correspond to the same first data field, and when two or more elements of a row are greater than or equal to the confidence probability threshold, it may be determined that the column header fields corresponding to these elements may be combined to a combined field. For example, if the confidence probability threshold is 0.3, and two elements of the $1^{st}$ row in the confidence matrix table are greater than or equal to 0.3, which are the $1^{st}$ and $2^{nd}$ second data fields (the field id and the field buff_remark) respectively, the two fields are a combined field. Likewise, in the $2^{nd}$ row, elements in the $1^{st}$, $2^{nd}$, and $3^{rd}$ columns are greater than the confidence probability threshold, and the corresponding field id, field buff_remark, and field name may be combined to a combined field; in the $3^{rd}$ row, elements in the $1^{st}$, $2^{nd}$, and $3_{rd}$ columns are greater than the confidence probability threshold, and the corresponding field id, field buff_remark, and field name may be combined to a combined field; and in the $4^{th}$ row, elements in the $3^{rd}$ and $4^{th}$ columns are greater than the confidence probability threshold, and the corresponding field name and field MaxLayer may be combined to a combined field. In Table 7, column header fields corresponding to cells showing numbers 1, 0.3, 0.6521, 0.42, 0.46, and 0.5 in units of rows are combined fields.

TABLE 7

Example 2 of the combined field

|  | id | buff_remark | name | MaxLayer |
|---|---|---|---|---|
| id | 1 | 0.3 | 0.21 | 0.05 |
| buff_remark | 0.6521 | 1 | 0.5 | 0.0652 |
| name | 0.42 | 0.46 | 1 | 0.24 |
| MaxLayer | 0.125 | 0.075 | 0.3 | 1 |

Therefore, three combined fields [the field id and the field buff_remark], [the field id, the field buff_remark, and the field name], and [the field name and the field MaxLayer] are obtained, and the field id, the field buff_remark, the field name, and the field MaxLayer independent from each other are four independent fields.

In addition, in some embodiments of the present invention, the method for detecting changed data according to this embodiment of the present invention may further include: calculating the confidence probability of the data table by using a gradient descent algorithm.

To calculate the confidence probability threshold of the data table, a consumption value needs to be calculated first. The total amount of unmatched confidence probability data after matching all confidence probability data corresponding to the data table with an a confidence template is the consumption value of the a confidence template. Assuming that the mistakenly changed data is changed for n times, it is proper that the consumption value is between n and 2n. By using a gradient descent algorithm, the minimum known confidence probability in the data table is used as a start point to calculate the corresponding consumption value until the consumption value corresponding to the confidence probability falls within the interval between n and 2n. If multiple consumption values corresponding to multiple confidence probabilities fall within the interval between n and 2n, the maximum confidence probability may be used as the confidence probability threshold.

The definition of the gradient descent algorithm is that if a real-valued function $F(x)$ is defined and differentiable at a point a, the function $F(x)$ decreases fastest in a direction $-\nabla F(a)$ opposite to the gradient at the point a. Therefore, if $b=a-\gamma \nabla F(a)$ for $\gamma>0$ small enough, $F(a) \geq F(b)$. An initial guess x0 for a local minimum of a function F is used as a start point, and the sequence x0, x1, x2 ... is considered, so that $xn+1=xn-\gamma n \nabla F(xn)$, where $n \geq 0$, then $F(x0) \geq F(x1) \geq F(x2) \geq ...$ is obtained, and if all goes well, the sequence (xn) converges to a desired extremum. The step size γ is allowed to change at every iteration.

Therefore, in this embodiment of the present invention, a large quantity of changes of each data field in a data table during a version change is recorded and analyzed to obtain an association between some data fields in any data table, and according to the association between the data fields, whether some data fields are changed unnecessarily or changes of some data fields are missed during a data change may be determined, thereby reducing manual determining processes when a large amount of data is changed, and improving speed and efficiency for detecting the large amount of changed data.

Figure 3:
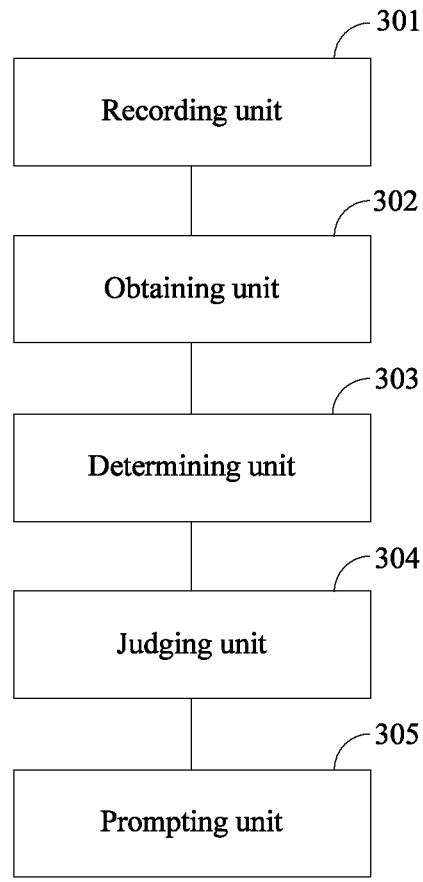
FIG. 3 illustrates a schematic diagram of an exemplary apparatus for detecting changed data according to an embodiment of the present invention.

Correspondingly, as shown in FIG. 3, an embodiment of the present invention further provides an apparatus for detecting changed data, which may include:

a recording unit 301, configured to record change status information of each data field in a data table during a version change;

an obtaining unit 302, configured to obtain, according to all the change status information, a probability of a second data field being changed at the same time when a first data field is changed, the probability being a confidence probability of the second data field being changed in the first data field being changed;

a determining unit 303, configured to determine, when confidence probabilities of at least two second data fields being changed in the same first data field being changed are greater than a confidence probability threshold of the data table, that the second data fields corresponding to the confidence probabilities greater than the confidence probability threshold are a combined field;

a judging unit 304, configured to determine whether a combination of the changed data fields matches a combined field template during the current version change, the combined field template being any combined field or a combination of at least two of the combined fields excluding same data fields; and a prompting unit 305, configured to prompt a location of the unmatched changed data field if the judging unit determines that the combination of the changed data fields does not match the combined field template during the current version change.

In some embodiments of the present invention, the obtaining unit may include:

a recording subunit, configured to record, according to all the change status information, the number of times that the second data field being changed at the same time when the first data field is changed; and an obtaining subunit, configured to divide the number of times that the second data field being changed at the same time when the first data field is changed by the number of times that the first data field is changed, to obtain the probability of the second data field being changed at the same time when the first data field is changed.

In some embodiments of the present invention, the recording subunit may be specifically configured to:

output a change matrix table according to all the change status information, where an element of the $i^{th}$ column of the $j^{th}$ row of the change matrix table indicates the number of times that the $j^{th}$ second data field being changed at the same time when the $i^{th}$ first data field is changed, where i and j are integers not less than 1.

The obtaining subunit may be specifically configured to:

output a confidence matrix table according to the change matrix table, where an element of the $i^{th}$ column of the $j^{th}$ row of the confidence matrix table is a result of dividing the element of the $i^{th}$ column of the $j^{th}$ row of the change matrix table by an element of the $i^{th}$ column of the $i^{th}$ row of the change matrix table, indicating a probability of the $j^{th}$ second data field being changed at the same time when the $i^{th}$ first data field is changed.

The determining subunit may be specifically configured to:

determine, when at least two elements of the $i^{th}$ column of the confidence matrix table are greater than the confidence probability threshold, that the $j^{th}$ second data fields corresponding to the elements greater than the confidence probability threshold are a combined field.

In some other embodiments of the present invention, the recording subunit may be specifically configured to:

output a change matrix table according to all the change status information, where an element of the $j^{th}$ column of the $i^{th}$ row of the change matrix table indicates the number of times that the $j^{th}$ second data field being changed at the same time when the $i^{th}$ first data field is changed, where i and j are integers not less than 1.

The obtaining subunit may be specifically configured to:

output a confidence matrix table according to the change matrix table, where an element of the $j^{th}$ column of the $i^{th}$ row of the confidence matrix table is a result of dividing the element of the $j^{th}$ column of the $i^{th}$ row of the change matrix table by an element of the $i^{th}$ column of the $i^{th}$ row of the change matrix table, indicating a probability of the $j^{th}$ second data field being changed at the same time when the $i^{th}$ first data field is changed.

The determining unit may be specifically configured to:

determine, when at least two elements of the $i^{th}$ row of the confidence matrix table are greater than the confidence probability threshold, that the $j^{th}$ second data fields corresponding to the elements greater than the confidence probability threshold are a combined field.

In some embodiments of the present invention, the apparatus for detecting changed data may further include:

a calculating unit, configured to calculate the confidence probability threshold of the data table by using a gradient descent algorithm.

Therefore, in this embodiment of the present invention, a large quantity of changes of each data field in a data table during a version change is recorded and analyzed to obtain an association between some data fields in any data table, and according to the association between the data fields, whether some data fields are changed unnecessarily or changes of some data fields are missed during a data change may be determined, thereby reducing manual determining processes when a large amount of data is changed, and improving speed and efficiency for detecting the large amount of changed data.

Figure 4:
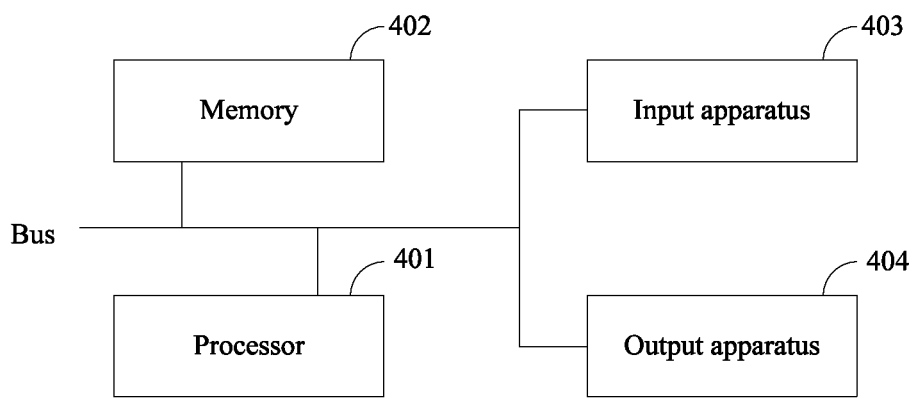
FIG. 4 illustrates a schematic diagram of an exemplary server for a method for detecting changed data according to an embodiment of the present invention.

Correspondingly, an embodiment of the present invention further provides a server. As shown in FIG. 4, the server may include:

a processor 401, a memory 402, an input apparatus 403, and an output apparatus 404. In this embodiment, the server may be a browser server, and the browser server may include one or more processors 401. A processor is used as an example in FIG. 4. In some embodiments of the present invention, the processor 401, the memory 402, the input apparatus 403, and the output apparatus 404 may be connected by using a bus or any other suitable manners. A connection by using a bus is used as an example in FIG. 4.

The memory 402 may be configured to store a software program and module. The processor 401 runs the software program and module stored in the memory 402, to implement various functional applications and data processing of the browser server. The memory 402 may mainly include a program storage area and a data storage area. The program storage area may store an operating system, an application program required by at least one function, and the like. In addition, the memory 402 may include a high speed random access memory, and may also include a non-volatile memory such as at least one magnetic disk storage device, a flash memory, or another volatile solid-state storage device. The input apparatus 403 may be configured to receive input digit or character information, and generate a keyboard signal input related to the user setting and function control of the browser server.

Specifically, in this embodiment, the processor 401 loads one or more executable files corresponding to one or more processes of one or more application programs into the memory 402 according to the following instructions, and the processor 401 runs the application program stored in the memory 402 to implement various functions:

record change status information of each data field in a data table during a version change;

obtain, according to all the change status information, a probability of a second data field being changed at the same time when a first data field is changed, the probability being a confidence probability of the second data field being changed in the first data field being changed;

determine, when confidence probabilities of at least two second data fields being changed in the same first data field being changed are greater than a confidence probability threshold of the data table, that the second data fields corresponding to the confidence probabilities greater than the confidence probability threshold are a combined field; and determine whether a combination of the changed data fields matches a combined field template during the current version change, and prompt a location of the unmatched changed data field if the combination of the changed data fields does not match the combined field template during the current version change, the combined field template being any combined field or a combination of at least two of the combined fields excluding same data fields.

Correspondingly, the obtaining, according to all the change status information, a probability of a second data field being changed at the same time when a first data field is changed may include:

recording, according to all the change status information, the number of times that the second data field being changed at the same time when the first data field is changed; and dividing the number of times that the second data field being changed at the same time when the first data field is changed by the number of times that the first data field is changed, to obtain the probability of the second data field being changed at the same time when the first data field is changed.

Correspondingly, the recording, according to all the change status information, the number of times that the second data field being changed at the same time when the first data field is changed may include:

outputting a change matrix table according to all the change status information, where an element of the $i^{th}$ column of the $j^{th}$ row of the change matrix table indicates the number of times that the $j^{th}$ second data field being changed at the same time when the $i^{th}$ first data field is changed, where i and j are integers not less than 1.

Correspondingly, the dividing the number of times that the second data field being changed at the same time when the first data field is changed by the number of times that the first data field is changed, to obtain the probability of the second data field being changed at the same time when the first data field is changed may include:

outputting a confidence matrix table according to the change matrix table, where an element of the $i^{th}$ column of the $j^{th}$ row of the confidence matrix table is a result of dividing the element of the $i^{th}$ column of the $j^{th}$ row of the change matrix table by an element of the $i^{th}$ column of the $i^{th}$ row of the change matrix table, indicating a probability of the $j^{th}$ second data field being changed at the same time when the $i^{th}$ first data field is changed.

Correspondingly, the determining, when confidence probabilities of at least two second data fields being changed in the same first data field being changed are greater than a confidence probability threshold of the data table, that the second data fields corresponding to the confidence probabilities greater than the confidence probability threshold are a combined field may include:

determining, when at least two elements of the $i^{th}$ column of the confidence matrix table are greater than the confidence probability threshold, that the $j^{th}$ second data fields corresponding to the elements greater than the confidence probability threshold are a combined field.

Correspondingly, the recording, according to all the change status information, the number of times that the second data field being changed at the same time when the first data field is changed may include:

outputting a change matrix table according to all the change status information, where an element of the $j^{th}$ column of the $i^{th}$ row of the change matrix table indicates the number of times that the $j^{th}$ second data field being changed at the same time when the $i^{th}$ first data field is changed, where i and j are integers not less than 1.

Correspondingly, the dividing the number of times that the second data field being changed at the same time when the first data field is changed by the number of times that the first data field is changed, to obtain the probability of the second data field being changed at the same time when the first data field is changed may include:

outputting a confidence matrix table according to the change matrix table, where an element of the $j^{th}$ column of the $i^{th}$ row of the confidence matrix table is a result of dividing the element of the $j^{th}$ column of the $i^{th}$ row of the change matrix table by an element of the $i^{th}$ column of the $i^{th}$ row of the change matrix table, indicating a probability of the $j^{th}$ second data field being changed at the same time when the $i^{th}$ first data field is changed.

Correspondingly, the determining, when confidence probabilities of at least two second data fields being changed in the same first data field being changed are greater than a confidence probability threshold of the data table, that the second data fields corresponding to the confidence probabilities greater than the confidence probability threshold are a combined field may include:

determining, when at least two elements of the $i^{th}$ row of the confidence matrix table are greater than the confidence probability threshold, that the $j^{th}$ second data fields corresponding to the elements greater than the confidence probability threshold are a combined field.

Correspondingly, the following may further be included:

calculating the confidence probability of the data table by using a gradient descent algorithm.

Therefore, in embodiments of the present invention, a large quantity of changes of each data field in a data table during a version change is recorded and analyzed to obtain an association between some data fields in any data table, and according to the association between the data fields, whether some data fields are changed mistakenly during a data change may be determined, thereby reducing manual determining processes when a large amount of data is changed, and improving speed and efficiency for detecting the large amount of changed data.

For example, various embodiments provide a non-transitory computer readable storage medium having one or more instructions stored therein. When executed by a computing device, the stored instructions may cause one or more processors in the computing device to: record change status information of each data field in a data table during a version change; obtain, according to the change status information, a probability of a second data field being changed at the same time when a first data field is changed, the probability being a confidence probability of the second data field being changed in the first data field being changed; determine, when confidence probabilities of at least two second data fields being changed in the first data field being changed are greater than a confidence probability threshold of the data table, that the second data fields corresponding to the confidence probabilities greater than the confidence probability threshold are a combined field; determine whether a combination of the changed data fields matches a combined field template during the version change, the combined field template being any combined field or a combination of at least two of the combined fields excluding same data fields; and prompt a location of the unmatched changed data field if the combination of the changed data fields does not match the combined field template during the version change.

It should be noted that the embodiments in this specification are all described in a progressive manner. Description of each of the embodiments focuses on differences from other embodiments, and reference may be made to each other for the same or similar parts among respective embodiments. The system or the apparatus disclosed by the embodiments is corresponding to the method disclosed by the embodiments, and therefore is only briefly described, and reference may be made to the description of the method part.

It should be noted that the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

Steps of the method or algorithm described with reference to the embodiments disclosed in the specification may be implemented by hardware, software modules executed by a processor, or a combination of software modules executed by a processor and hardware. The software modules may be stored in a random access memory (RAM), a memory, a read-only memory (ROM), an electrically programmable ROM, an electrically erasable programmable ROM, a register, a hard disk, a removable disk, a CD-ROM, or a storage medium, such as a non-transitory computer readable storage medium, of any other forms known by a person skilled in the art.

The above description of the disclosed embodiments enables a person skilled in the art to implement or use the present disclosure. Various modifications to these embodiments are obvious to a person skilled in the art. The general principle defined in this disclosure may be implemented in other embodiments without departing from the spirit or scope of the present disclosure. Thus, the present disclosure is not intended to be limited to the embodiments shown herein but shall be defined by the widest scope consistent with the principles and novel features disclosed herein.

What is claimed is:

1. A method for detecting changed data using a computing device including a memory and a processor couple to the memory, the method comprising:

recording, by the processor, change status information of each data field in a data table during a version change, the version change including a change in data involved in at least one of programs, codes, resources, and test contents;

recording, by the processor, and according to the change status information, the number of times that a second data field being changed at the same time when a first data field is changed, comprising:

outputting a change matrix table according to the change status information, wherein an element of the $i^{th}$ column of the $j^{th}$ row of the change matrix table indicates the number of times that the $j^{th}$ second data field being changed at the same time when the $i^{th}$ first data field is changed, or an element of the $j^{th}$ column of the $i^{th}$ row of the change matrix table indicates the number of times that the $j^{th}$ second data field being changed at the same time when the $i^{th}$ first data field is changed, wherein i and j are integers not less than 1;

dividing the number of times that the second data field being changed at the same time when the first data field is changed by the number of times that the first data field is changed, to obtain a confidence probability of the second data field being changed at the same time when the first data field is changed;

determining, by the processor, when confidence probabilities of at least two second data fields being changed in the first data field being changed are greater than a confidence probability threshold of the data table, that the second data fields corresponding to the confidence probabilities greater than the confidence probability threshold are a combined field;

determining, by the processor, whether the combined field matches a combined field template during the version change; and identifying, by the processor, a location in the data table where the combined field does not match the combined field template during the version change so as to determine whether a data field is changed unnecessarily or a change of the data field is mistakenly missed during the version change, thereby reducing manual inspection and improve data inspection efficiency.

2. The method according to claim 1, wherein the dividing the number of times that the second data field being changed at the same time when the first data field is changed by the number of times that the first data field is changed, to obtain the confidence probability of the second data field being changed at the same time when the first data field is changed comprises:

outputting a confidence matrix table according to the change matrix table, wherein an element of the $i^{th}$ column of the $j^{th}$ row of the confidence matrix table is a result of dividing the element of the $i^{th}$ column of the $j^{th}$ row of the change matrix table by an element of the $i^{th}$ column of the $i^{th}$ row of the change matrix table, indicating a probability of the $j^{th}$ second data field being changed at the same time when the $i^{th}$ first data field is changed.

3. The method according to claim 1, wherein the determining, when confidence probabilities of at least two second data fields being changed in the first data field being changed are greater than the confidence probability threshold of the data table, that the second data fields corresponding to the confidence probabilities greater than the confidence probability threshold are a combined field comprises:

determining, when at least two elements of the $i^{th}$ column of the confidence matrix table are greater than the confidence probability threshold, that the $j^{th}$ second data fields corresponding to the at least two elements greater than the confidence probability threshold are the combined field.

4. The method according to claim 1, wherein the dividing the number of times that the second data field being changed at the same time when the first data field is changed by the number of times that the first data field is changed, to obtain the confidence probability of the second data field being changed at the same time when the first data field is changed comprises:

outputting a confidence matrix table according to the change matrix table, wherein an element of the $j^{th}$ column of the $i^{th}$ row of the confidence matrix table is a result of dividing the element of the $j^{th}$ column of the $i^{th}$ row of the change matrix table by an element of the $i^{th}$ column of the $i^{th}$ row of the change matrix table, wherein the element of $j^{th}$ column of the $i^{th}$ row of the confidence matrix table indicates a probability of the $j^{th}$ second data field being changed at the same time when the $i^{th}$ first data field is changed.

5. The method according to claim 4, wherein the determining, when confidence probabilities of at least two second data fields being changed in the first data field being changed are greater than the confidence probability threshold of the data table, that the second data fields corresponding to the confidence probabilities greater than the confidence probability threshold are a combined field comprises:

determining, when at least two elements of the $i^{th}$ row of the confidence matrix table are greater than the confidence probability threshold, that the $j^{th}$ second data fields corresponding to the at least two elements greater than the confidence probability threshold are the combined field.

6. The method according to claim 1, further comprising: calculating the confidence probability threshold of the data table by using a gradient descent algorithm.

7. The method according to claim 1, wherein the change matrix table is a symmetrical matrix.

8. An apparatus for detecting changed data, the apparatus comprising:

a memory and a processor coupled to the memory, the processor being configured to:

record change status information of each data field in a data table during a version change, the version change including a change in data involved in at least one of programs, codes, resources, and test contents;

record, according to the change status information, the number of times that a second data field being changed at the same time when a first data field is changed, comprising:

outputting a change matrix table according to the change status information, wherein an element of the $i^{th}$ column of the $j^{th}$ row of the change matrix table indicates the number of times that the $j^{th}$ second data field being changed at the same time when the $i^{th}$ first data field is changed, or an element of the $j^{th}$ column of the $i^{th}$ row of the change matrix table indicates the number of times that the $j^{th}$ second data field being changed at the same time when the $i^{th}$ first data field is changed, wherein i and j are integers not less than 1;

dividing the number of times that the second data field being changed at the same time when the first data field is changed by the number of times that the first data field is changed, to obtain a confidence probability of the second data field being changed at the same time when the first data field is changed;

determine, when confidence probabilities of at least two second data fields being changed in the same first data field being changed are greater than a confidence probability threshold of the data table, that the second data fields corresponding to the confidence probabilities greater than the confidence probability threshold are a combined field;

determine whether the combined field matches a combined field template during the version change; and identify a location in the data table where the combined field does not match the combined field template during the current version change so as to determine whether a data field is changed unnecessarily or a change of the data field is mistakenly missed during the version change, thereby reducing manual inspection and improve data inspection efficiency.

9. The apparatus according to claim 8, wherein the processor is further configured to:

output a confidence matrix table according to the change matrix table, wherein an element of the $i^{th}$ column of the $j^{th}$ row of the confidence matrix table is a result of dividing the element of the $i^{th}$ column of the $j^{th}$ row of the change matrix table by an element of the $i^{th}$ column of the $i^{th}$ row of the change matrix table, indicating a probability of the $j^{th}$ second data field being changed at the same time when the $i^{th}$ first data field is changed.

10. The apparatus according to claim 9, wherein the processor is further configured to:

determine, when at least two elements of the $i^{th}$ column of the confidence matrix table are greater than the confidence probability threshold, that the $j^{th}$ second data fields corresponding to the at least two elements greater than the confidence probability threshold are the combined field.

11. The apparatus according to claim 8, wherein the processor is further configured to:

output a confidence matrix table according to the change matrix table, wherein an element of the $j^{th}$ column of the $i^{th}$ row of the confidence matrix table is a result of dividing the element of the $j^{th}$ column of the $i^{th}$ row of the change matrix table by an element of the $i^{th}$ column of the $i^{th}$ row of the change matrix table, indicating a probability of the $j^{th}$ second data field being changed at the same time when the $i^{th}$ first data field is changed.

12. The apparatus according to claim 11, wherein the processor is further configured to:

determine, when at least two elements of the $i^{th}$ row of the confidence matrix table are greater than the confidence probability threshold, that the $j^{th}$ second data fields corresponding to the at least two elements greater than the confidence probability threshold are the combined field.

13. The apparatus according to claim 8, wherein the processor is further configured to:

calculate the confidence probability threshold of the data table by using a gradient descent algorithm.

14. The apparatus according to claim 8, wherein the change matrix table is a symmetrical matrix.

15. A non-transitory computer readable storage medium having stored therein one or more instructions, which, when executed by a computing device, cause the computing device to:

record change status information of each data field in a data table during a version change, the version change including a change in data involved in at least one of programs, codes, resources, and test contents;

record, according to the change status information, the number of times that a second data field being changed at the same time when a first data field is changed, comprising:

outputting a change matrix table according to the change status information, wherein an element of the $i^{th}$ column of the $j^{th}$ row of the change matrix table indicates the number of times that the $j^{th}$ second data field being changed at the same time when the $i^{th}$ first data field is changed, or an element of the $j^{th}$ column of the $i^{th}$ row of the change matrix table indicates the number of times that the $j^{th}$ second data field being changed at the same time when the $i^{th}$ first data field is changed, wherein i and j are integers not less than 1;

dividing the number of times that the second data field being changed at the same time when the first data field is changed by the number of times that the first data field is changed, to obtain a confidence probability of the second data field being changed at the same time when the first data field is changed;

determine, when confidence probabilities of at least two second data fields being changed in the first data field being changed are greater than a confidence probability threshold of the data table, that the second data fields corresponding to the confidence probabilities greater than the confidence probability threshold are a combined field;

determine whether the combined field matches a combined field template during the version change; and identify a location in the data table where the combined field does not match the combined field template during the version change so as to determine whether some data fields are changed unnecessarily or changes of some data fields are mistakenly missed during the version change, thereby reducing manual inspection and improve data inspection efficiency.

16. The non-transitory computer readable storage medium according to claim 15, wherein the change matrix table is a symmetrical matrix.

* * * * *